United States Patent [19]

Kurihara et al.

[11] Patent Number: 5,251,602
[45] Date of Patent: Oct. 12, 1993

[54] FUEL SUPPLY SYSTEM FOR GAS-FUELED ENGINE

[75] Inventors: Noriuiki Kurihara; Yoshikatsu Iida, both of Iwata, Japan

[73] Assignee: Yamaha Hatsudoki Kabushiki Kaisha, Iwata, Japan

[21] Appl. No.: 869,374

[22] Filed: Apr. 16, 1992

[30] Foreign Application Priority Data

Apr. 20, 1991 [JP] Japan .................................. 3-116991
Apr. 20, 1991 [JP] Japan .................................. 3-116994

[51] Int. Cl.⁵ ............................................ F02M 21/02
[52] U.S. Cl. .................................... 123/527; 123/701
[58] Field of Search ............... 123/527, 672, 585, 701; 48/180.1, 189.1, 189.2

[56] References Cited

U.S. PATENT DOCUMENTS

| | | | |
|---|---|---|---|
| 4,263,882 | 4/1981 | Tezuka et al. | 123/432 |
| 4,304,211 | 12/1981 | Tezuka et al. | 123/585 |
| 4,346,682 | 8/1982 | Mader | 123/527 |
| 4,483,303 | 11/1984 | Ishikawa et al. | 123/527 |
| 4,553,519 | 11/1985 | Masson | 123/527 |
| 4,638,777 | 1/1987 | Fanner et al. | 123/527 |
| 4,638,783 | 1/1987 | Snyder | 123/527 |
| 4,829,957 | 5/1989 | Garretson et al. | 123/527 |
| 4,932,378 | 6/1990 | Hitomi | 123/432 |
| 4,953,516 | 9/1990 | van der Weide et al. | 123/527 |
| 5,136,986 | 8/1992 | Jensen | 123/527 |
| 5,140,959 | 8/1992 | Durbin | 123/527 |

FOREIGN PATENT DOCUMENTS

| | | |
|---|---|---|
| 0182223 | 5/1986 | European Pat. Off. . |
| 0346989 | 12/1989 | European Pat. Off. . |
| 3913358 | 10/1990 | Fed. Rep. of Germany . |
| 62-131908 | 6/1987 | Japan . |
| 1-92505 | 4/1989 | Japan . |
| 2-191807 | 7/1990 | Japan . |
| 2-118110 | 9/1990 | Japan . |
| 2-118111 | 9/1990 | Japan . |
| 2-139307 | 11/1990 | Japan . |
| 0865413 | 4/1961 | United Kingdom . |
| 2086485 | 5/1982 | United Kingdom . |
| 2139699 | 11/1984 | United Kingdom . |

*Primary Examiner*—Willis R. Wolfe
*Assistant Examiner*—Thomas Moulis
*Attorney, Agent, or Firm*—Ernest A. Beutler

[57] ABSTRACT

Two embodiments of air/fuel ratio adjusting systems for gaseous-fueled internal combustion engines. In each embodiment, a pressure regulator supplies regulated fuel in gaseous form from a source in which it is stored in a liquid form to a charge former that has a fuel control device such as a needle valve. The air/fuel ratio is maintained constant by mixing atmospheric air with the fuel before the charge former fuel control device under the control of an oxygen sensor in the exhaust system. In one embodiment, an enrichment system is also incorporated for supplying enrichment fuel under acceleration or cold starting conditions.

23 Claims, 5 Drawing Sheets

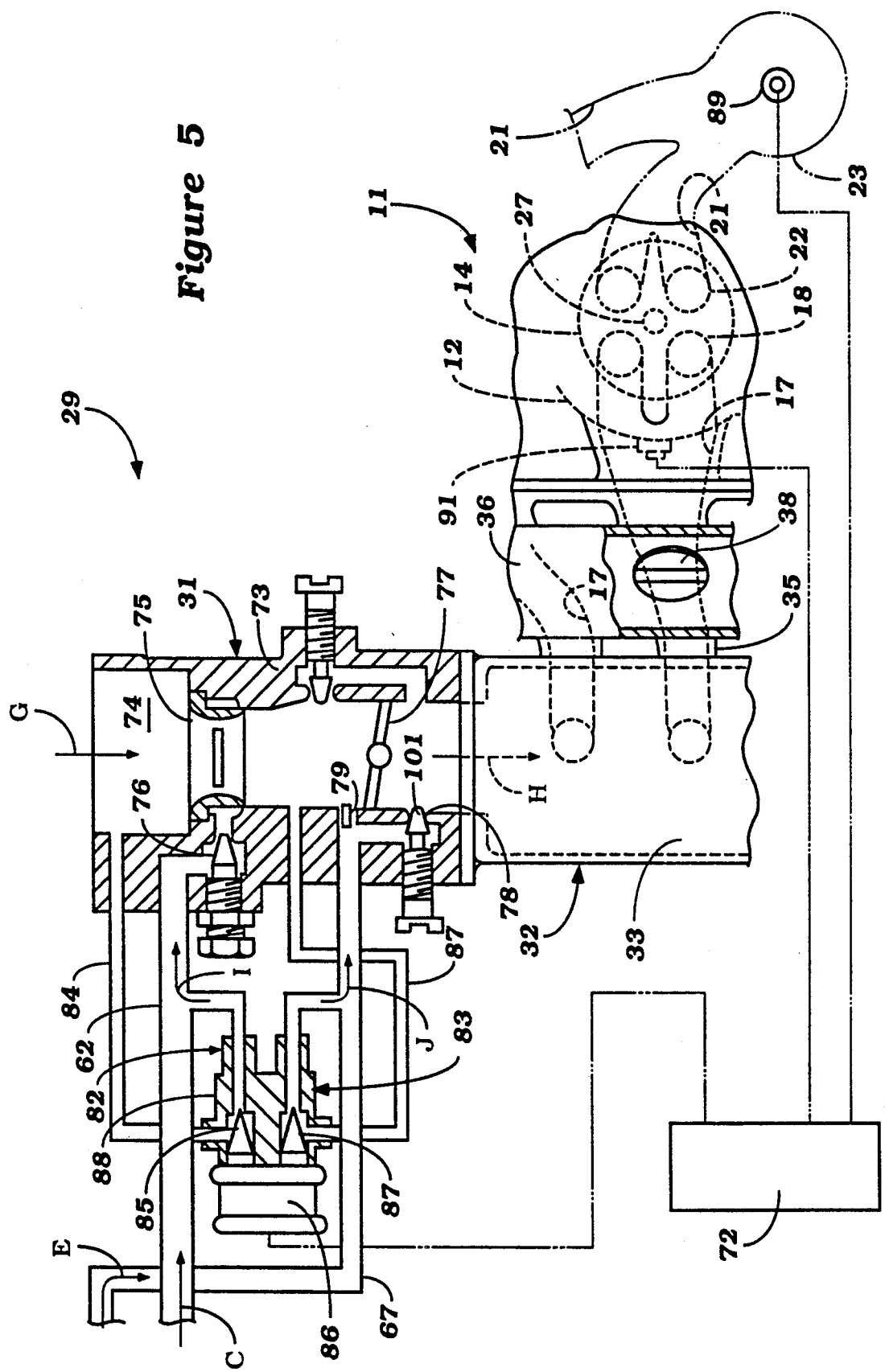

FUEL SUPPLY SYSTEM FOR GAS-FUELED ENGINE

BACKGROUND OF THE INVENTION

This invention relates to a fuel supply system for a gas-fueled engine and more particularly to an improved charge forming system for a gas-fueled engine.

It has been proposed to operate internal combustion engines on a gaseous type of fuel which is stored under high pressure as a liquid (L.P.G.). The gaseous fuel is then delivered to the engine through some form of charge forming system after the pressure of the gaseous fuel has been regulated to a pressure that is at or slightly above atmospheric pressure. The use of this type of fuel has a number of advantages, particularly due to its clean burning nature. This not only prolongs engine life and can reduce service intervals, but also offers prospects of increased exhaust emission control, fuel economy and conservation of fuel reserves.

Although such gaseous fuels have the aforenoted advantages, it is somewhat more difficult to control accurately the air/fuel ratio with gaseous fuels because of their nature. For example, it has been proposed to control the air/fuel ratio of a gaseous fueled engine by mixing atmospheric air with the gaseous fuel before the fuel is delivered to the charge former. However, this has previously been done by mixing the atmospheric air with the gaseous fuel after the fuel has been passed through a flow regulating throttle type valve. As a result, the air is mixed with the fuel when it is at an extremely low absolute pressure and which may, in fact, even be slightly less than atmospheric pressure. As a result, when the air is added, the amount of gaseous fuel supplied is not reduced and the air/fuel ratio cannot be as accurately controlled as desired.

It is, therefore, a principal object to this invention to provide an improved charge forming system for an engine operated on a gaseous fuel.

It is a further object to this invention to provide a charge forming system for a gaseous fueled engine wherein the air/fuel ratio can be accurately controlled.

It is a further object to this invention to provide a charge forming system for a gaseous fueled internal combustion engine wherein the air/fuel ratio is controlled by mixing air with the gaseous fuel after the pressure of the gaseous fuel has been regulated but before the flow of the gaseous fuel is throttled in the charge forming device.

SUMMARY OF THE INVENTION

This invention is adapted to be embodied in a charge forming system for an internal combustion engine comprising a charge former for mixing fuel with atmospheric air for delivery to a combustion chamber of the engine. The charge former has fuel control means for controlling the amount of fuel mixed with the atmospheric air in the charge former. A source of gaseous fuel stored under pressure as a liquid is provided and pressure regulator means communicate with this source for reducing the pressure of the fuel in a gaseous state for delivery to the charge former fuel control means. In accordance with the invention, means are provided for selectively mixing atmospheric air with the fuel at a point between the regulator and the charge former fuel control means for maintaining the desired fuel/air ratio.

BRIEF DESCRIPTION OF THE DRAWINGS

FIG. 5 is a view in part similar to FIG. 2 showing the cooperation of the regulator of the embodiment of FIG. 4 with the engine and with a further modified charge former.

DETAILED DESCRIPTION OF THE PREFERRED EMBODIMENTS OF THE INVENTION

Figure 1:
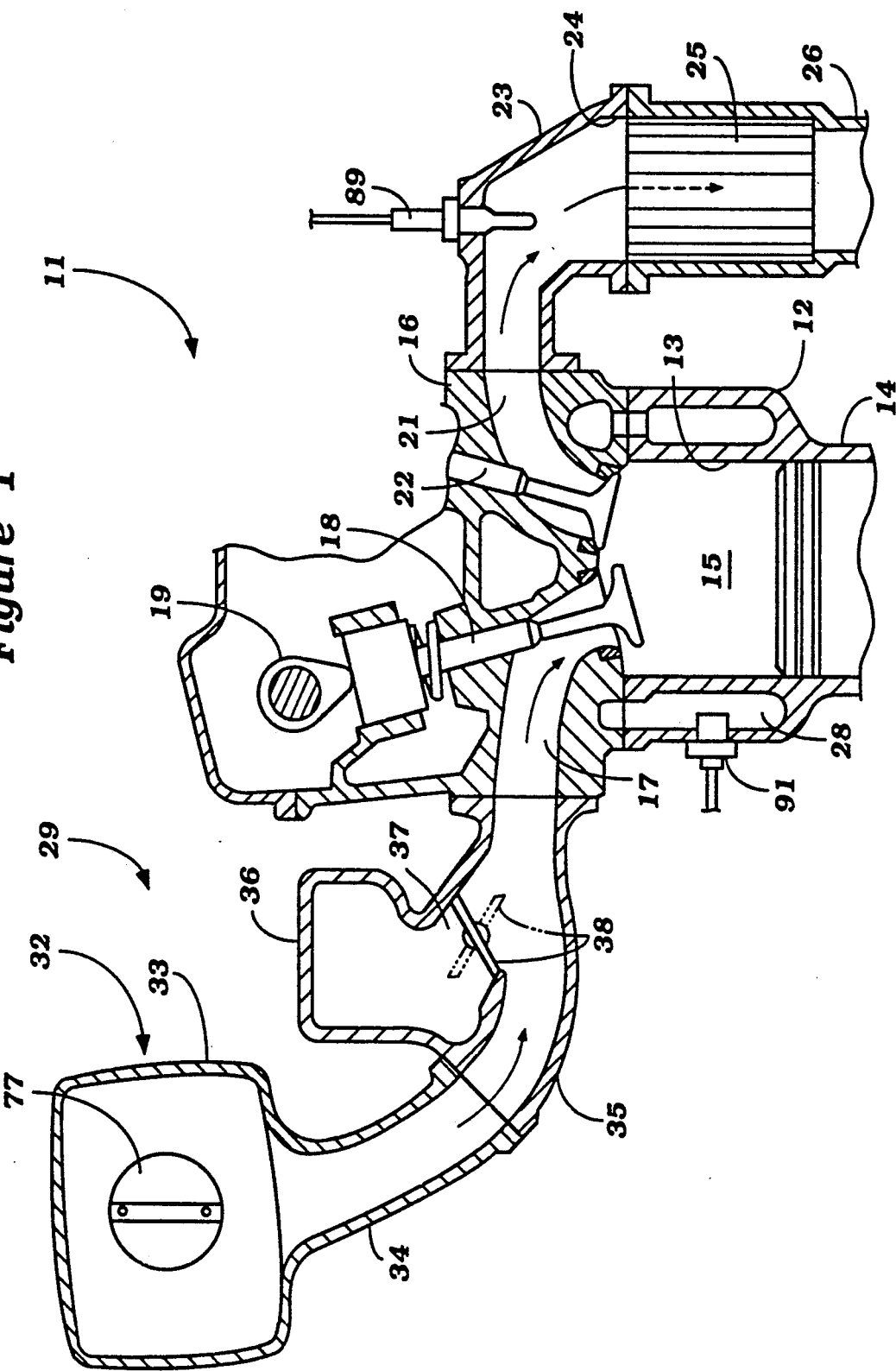
FIG. 1 is a partial cross sectional view taken through a portion of a single cylinder of an internal combustion engine constructed in accordance with an embodiment of the invention.
Figure 2:
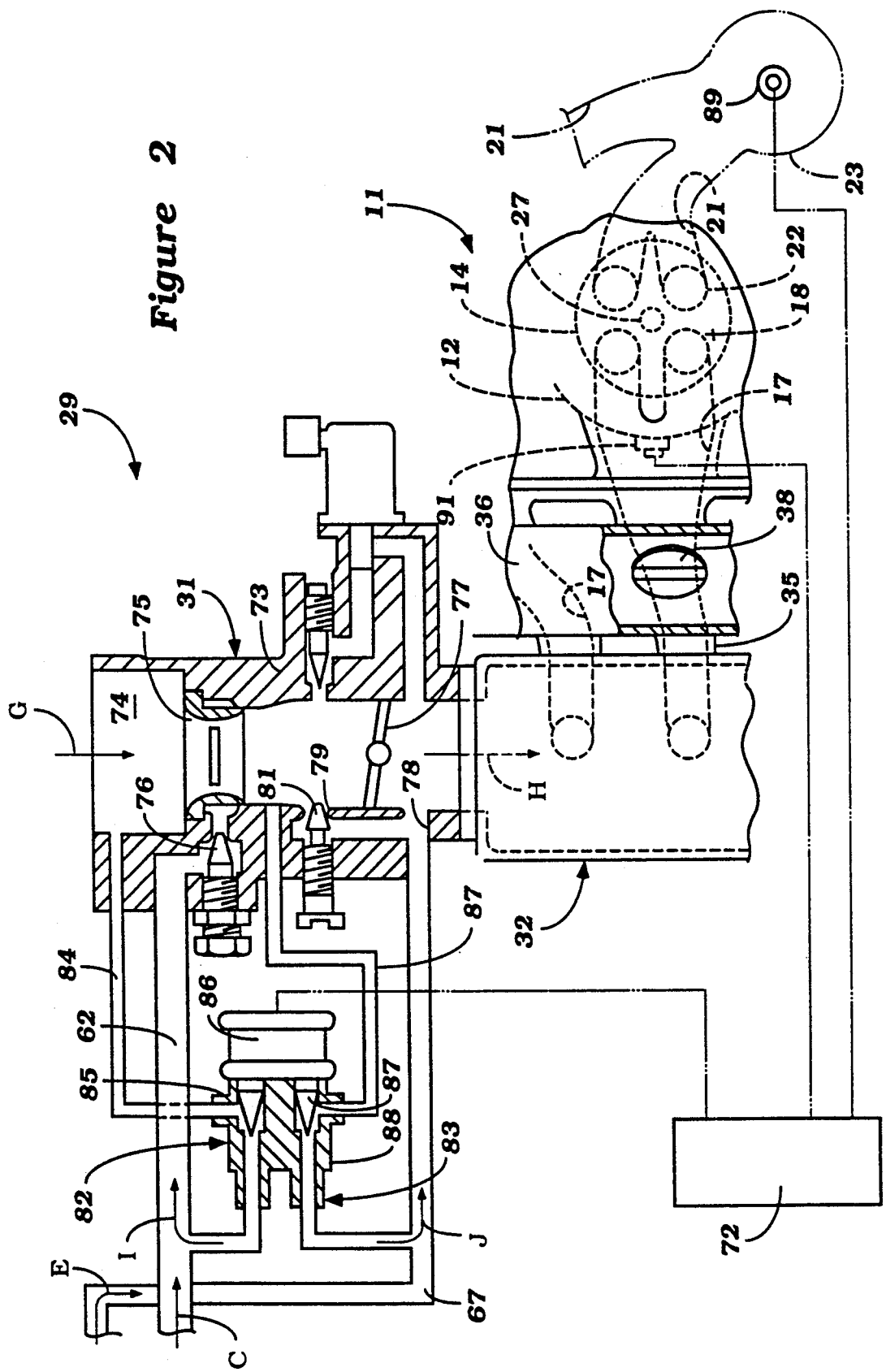
FIG. 2 is a partially schematic top plan view of the portion of the engine shown in FIG. 1 and also shows a part of the fuel supply system for the engine and the control therefore.

Referring now in detail to the drawings and initially primarily to FIGS. 1 and 2, an internal combustion engine provided with a fuel supply system constructed in accordance with a first embodiment of the invention is shown partially and identified generally by the reference numeral 11. The engine 11 is only shown partially because the internal details of the engine, except for its charge forming system and the controls therefore, form no part of the invention. However, a portion of the engine 11 is depicted for ease in understanding how the invention may be practiced in conjunction with any known types of internal combustion engines. It also should be noted that the charge forming system is not limited to use in reciprocating engines of the type depicted but may be also employed with rotary type of engines. Also, the invention is described in conjunction with only a single cylinder of a multi-cylinder engine as it is believed that those skilled in the art can readily understand how the invention is practiced in conjunction with multiple cylinder engines and engines of varying configurations.

The engine 11 includes a cylinder block 12 have one or more cylinder bores 13 in which pistons 14 are slidably supported. The pistons 14 are connected in a known manner by connecting rods (not shown) to a crankshaft for providing an output from the engine 11. The cylinder bore 13 and head of the piston 14 form a combustion chamber 15 along with a cylinder head 16 that is affixed in a known manner to the cylinder block 12.

One or more intake passages 17 extend through one side of the cylinder head assembly 16 and have their communication with the combustion chamber 15 controlled by poppet valves 18 that are slidably supported in the cylinder head 16 in a well known manner. An intake camshaft 19 is rotatably journalled in the cylinder head 16 and operates the intake valves 18 in well known manner.

An exhaust passage 21 extends through the opposite side of the cylinder head 16 from each combustion chamber 15. The flow through the exhaust passages 21 is controlled by poppet type exhaust valves 22 which are also operated by an overhead mounted camshaft (not shown) in a well known manner.

An exhaust manifold 23 is affixed to the exhaust side of the cylinder head 16 and receives the exhaust gases from the exhaust passages 21. An outlet 24 of the exhaust manifold 23 communicates with a catalytic converter 25 having a catalyst bed that includes a so called three-way catalyzer for oxidizing carbon monoxide (CO) and hydrocarbons (HC) while deoxidizing nitrous oxide ($NO_x$) to render the exhaust gases as harmless as possible. The exhaust gases thus treated are then discharged to the atmosphere through an exhaust pipe 26 and appropriate exhaust and muffler system (not shown).

In the illustrated embodiment, the engine 11 is of the four valve per cylinder type (i.e. two intake valves 18 and two exhaust valves 22 per cylinder). Of course, it should be readily apparent to those skilled in the art that the invention can be employed with engines having other types of valving or porting systems. A spark plug 27 is mounted in the cylinder head 16 and has its spark gap disposed centrally in the combustion chamber 15 for firing the charge therein in a well known manner.

The engine 11 is also water-cooled in the illustrated embodiment and to this end the cylinder block 12 and cylinder head 16 are provided with a cooling jacket or cooling jackets 28 through which liquid coolant is circulated by means of a coolant pump (not shown). This coolant is then passed through an external heat exchanger (not shown) for cooling in a well known manner.

A fuel/air charge is supplied to the combustion chambers 17 by means of an induction and charge forming system, indicated generally by the reference numeral 29 and which includes a charge former in the form of a carburetor 31 which is mounted in the inlet section of an elongated plenum chamber 32 that extends along the intake side of the engine and which is defined by an outer housing 33. A plurality of individual runner sections 34 extend from the housing section 33 to individual manifold runners 35 which supply each of the intake ports 17 of the engine 11.

In order to improve the charging efficiency of the engine 11 at high speeds, a high speed plenum chamber 36 extends along the upper portion of the manifold runners 35 and communicates with the individual runners through passages 37. Throttle valves 38 are provided in the passages 37 for communicating the high speed plenum chamber 36 with the passages 35. The throttle valves 38 are maintained in a closed position, as shown in solid lines in FIG. 1, when the engine 11 is operating at low and mid range speeds. However, as the engine reaches high speed, the throttle valves 38 are opened to the phantom line position shown in FIG. 1 so as to communicate the high speed plenum chamber 36 with the individual runners 35. In this way, the intake pulses from the individual cylinders 13 of the engine will be employed for adding to the charging efficiency of the engine 11 and improve its high speed performance.

Figure 3:
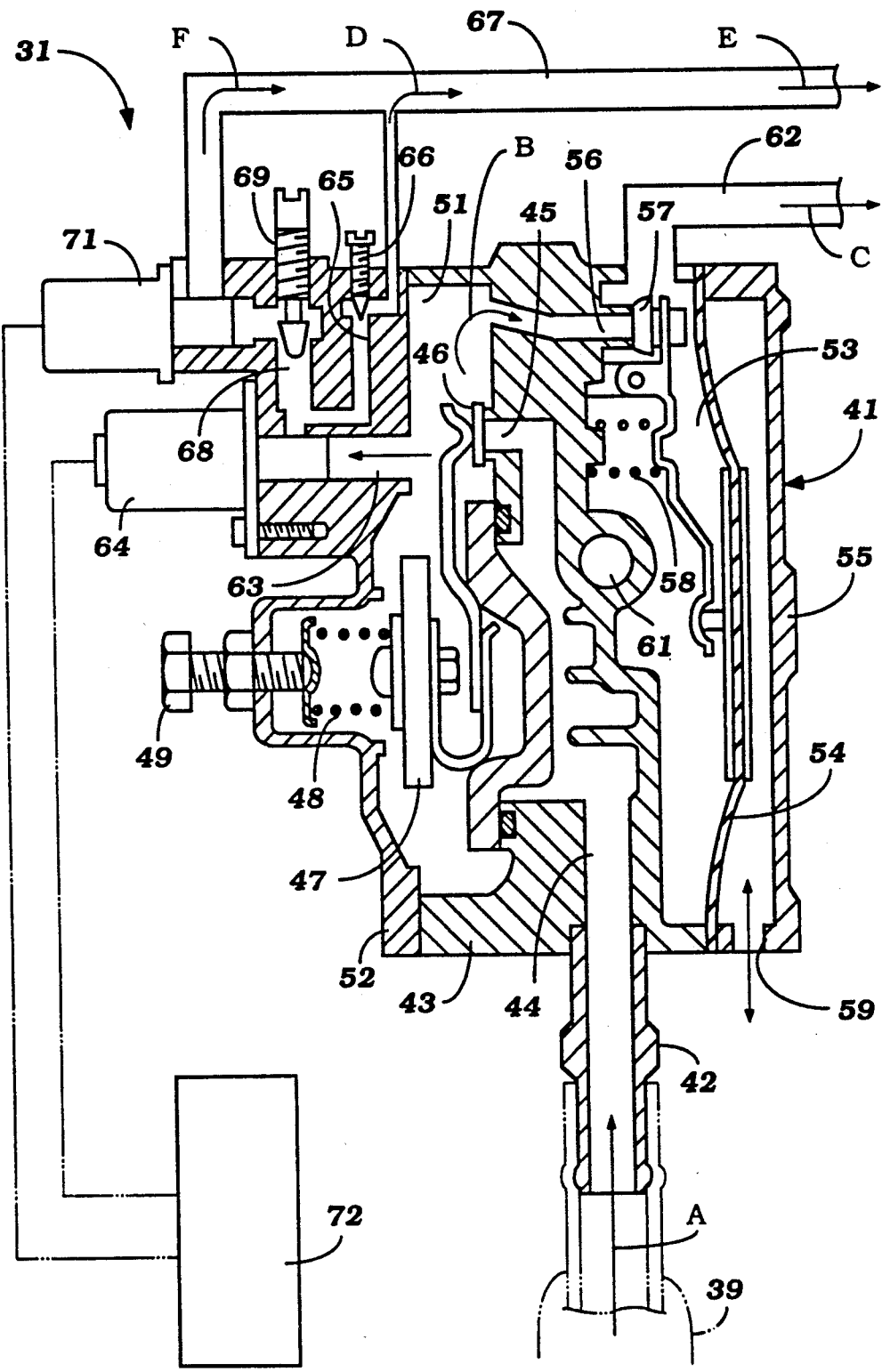
FIG. 3 is a cross sectional view taken through a fuel pressure regulator constructed in accordance with a first embodiment of the invention.

In accordance with the invention, the engine 11 is fueled with a gaseous fuel that is stored under pressure as a liquid in a pressure source, show in phantom at 39 in FIG. 3. The fuel from the high pressure source 39 is delivered to a pressure regulator, indicated generally by the reference numeral 41 through an inlet conduit 42 of the regulator 41 as shown by the arrow A.

The regulator 41 is comprised of an outer housing assembly including a main body portion 43 in which an inlet passage 44 is formed that communicates with the inlet fitting 42. The passage 44 extends to a first pressure stage regulating port 45 which has its opening and closing controlled by a valve 46 that is operated by an assembly 47 which is biased by a spring 48 have its preload adjusted by a screw 49. The valve 46 opens and closes communication with a chamber 51 formed by the housing 43 and a first cover plate 52 so as to reduce the pressure of the gaseous fuel in a first stage to a pressure of about 0.3 $Kg/cm_2$ gage.

The first regulating chamber 51 communicates with a second regulating chamber 53 formed by a cavity in the side of the main housing member 43 opposite the cover plate 52 and which is closed by means of a diaphragm 54 held in place by a second cover plate 55. A passageway 56 communicates the chamber 53 with the chamber 51 and a second pressure regulating valve 57 operated by the diaphragm 54 controls the opening and closing of the passageway 56 so that gas will flow in the direction of the arrow B. A biasing spring 58 acts against the diaphragm 54 and the backside of the diaphragm 54 is opened to atmospheric pressure through an atmospheric port 59 so that the second regulating stage will reduce the pressure of the gaseous fuel in the chamber 53 to just slightly below atmospheric pressure.

The liquid coolant which has been heated in the engine cooling jacket 28 is also circulated through the regulator 41 and to this end there is provided an internal heating passage 61 formed in the main housing 43 which is in communication both with the gas entering the inlet passage 44 and the second regulating chamber 53 so as to maintain a more uniform temperature of the gas in the regulator 41 so as to insure better regulation and better control of the pressure of the gaseous fuel delivered to the charge former 31.

An outlet conduit 62 delivers the two stage pressure regulated gaseous fuel to the main fuel circuit of the carburetor 31 as shown by the arrow C. This main fuel circuit will be described later by reference again to FIG. 2.

Gaseous fuel is also supplied from the regulator 41 to the idle and off-idle circuits of the carburetor 31 but at a slightly higher pressure than the fuel pressure supplied to the main fuel circuit. To accomplish this, a second delivery passage 63 is formed in the cover plate 52 and communicates with the first regulating chamber 51. An electrically operated shut-off valve 64 controls the communication of the passage 63 with a further supply passage 65 formed in the cover 52. A flow controlling needle valve 66 communicates the passage 65 with a conduit 67 which extends to the idle and off-idle circuits of the carburetor 31 in a manner which will be described also by reference to FIG. 2. This idle fuel flow is indicated by the arrow D.

The passage 63 also supplies an enrichment passage 68 formed in the cover plate 52 and in which a flow controlling needle valve 69 is positioned. An electrically operated enrichment valve 71 controls the communication of the passage 68 with the conduit 67 to permit flow as indicated by the arrow F.

A CPU, indicated generally by the reference numeral 72 is provided for controlling the fuel system including the shut-off valve 64 and the enrichment valve 71. The CPU 72 closes the shut-off valve 64 under conditions when the engine is not operating, under extreme decelerations, or in the event of an emergency such as a collision.

The enrichment valve 71 is opened by the CPU 72 under conditions of cold start or acceleration as determined by rapid opening of the throttle valve of the carburetor 31.

Referring now again to FIG. 2, the carburetor 31 includes a main body portion 73 which defines an air horn 74 that received atmospheric air, indicated by the arrow G, from a suitable air cleaner and/or air silencer (not shown).

A venturi section 75 is formed downstream of the air horn 74 and has fuel discharge openings for discharging gases fuel from the regulator supplied conduit 62. A flow controlling needle valve 76 controls the amount of fuel discharged through the venturi section fuel discharge 75.

A throttle valve 77 is positioned downstream of the venturi section 75 and is controlled by a remote throttle control mechanism, as is well known in this art. The throttle valve 77 communicates directly with the plenum chamber 32, as aforenoted.

The carburetor 31 is also provided with an idle fuel discharge port 78 which is positioned downstream of the throttle valve 77 and an upstream transition port 79 with the flow through this port 79 being controlled by an adjustable needle valve 81. The conduit 67 from the first pressure regulating stage 51 of the pressure regulator 41 supplies the idle port 78 and transition port 79.

Although the needle valves 76 and 81 are supplied for adjusting the fuel/air ratio from the main fuel discharge nozzle 75 and from the transition port 79, these needle valves only give a course adjustment and are not adapted to control minute variations to maintain a uniform air/fuel ratio under all running conditions. This is extremely important to the efficient running of the engine and the good operation of the catalytic converter 25. Therefore, a pair of air bleed control valves, indicated generally by the reference numerals 82 and 83 are provided for bleeding air into the main fuel supply conduit 62 and idle fuel supply conduit 67, respectively.

The main fuel air bleed valve 82 receives atmospheric air from the air horn 74 through a conduit 84 and mixes it as shown by the arrow I under the control of a needle valve 85 that is operated by a solenoid operated stepping motor 86. In a like manner, the idle air bleed valve 87 receives atmospheric air from a conduit 87 downstream of the venturi section 75 and delivers it to the idle fuel supply line 67 as shown by the arrow J under the control of a needle valve 87 which, in this embodiment, is also controlled by the same stepping motor 87. The valves 82 and 83 are positioned in a common housing 88 in this embodiment. If desired, the values 82 and 83 may be operated separately by independently controlled stepping motors.

The stepping motor 86 is also controlled by the CPU 72 which receives inputs from an oxygen sensor 89 positioned in the exhaust manifold 23 upstream of the catalytic convertor 25. The CPU 72 also receives an engine temperature signal from an engine temperature sensor 91 for providing the cold starting enrichment control of the enrichment solenoid 71. In addition, a throttle position sensor (not shown) outputs a signal to the CPU 72 for acceleration enrichment. Various other ambient or engine conditions may be supplied to the CPU 72 for also controlling its operation.

Since the air is bled into the main fuel supply conduit 62 and idle supply conduit 67 upstream of the flow controlling needle valves 76 and 81, the air/fuel ratio may be more accurately controlled so as to maintain it in the range of 15.5 ±0.1. As a result, the engine 11 can be operated with extremely good fuel control, fuel economy and exhaust emission control.

Figure 4:
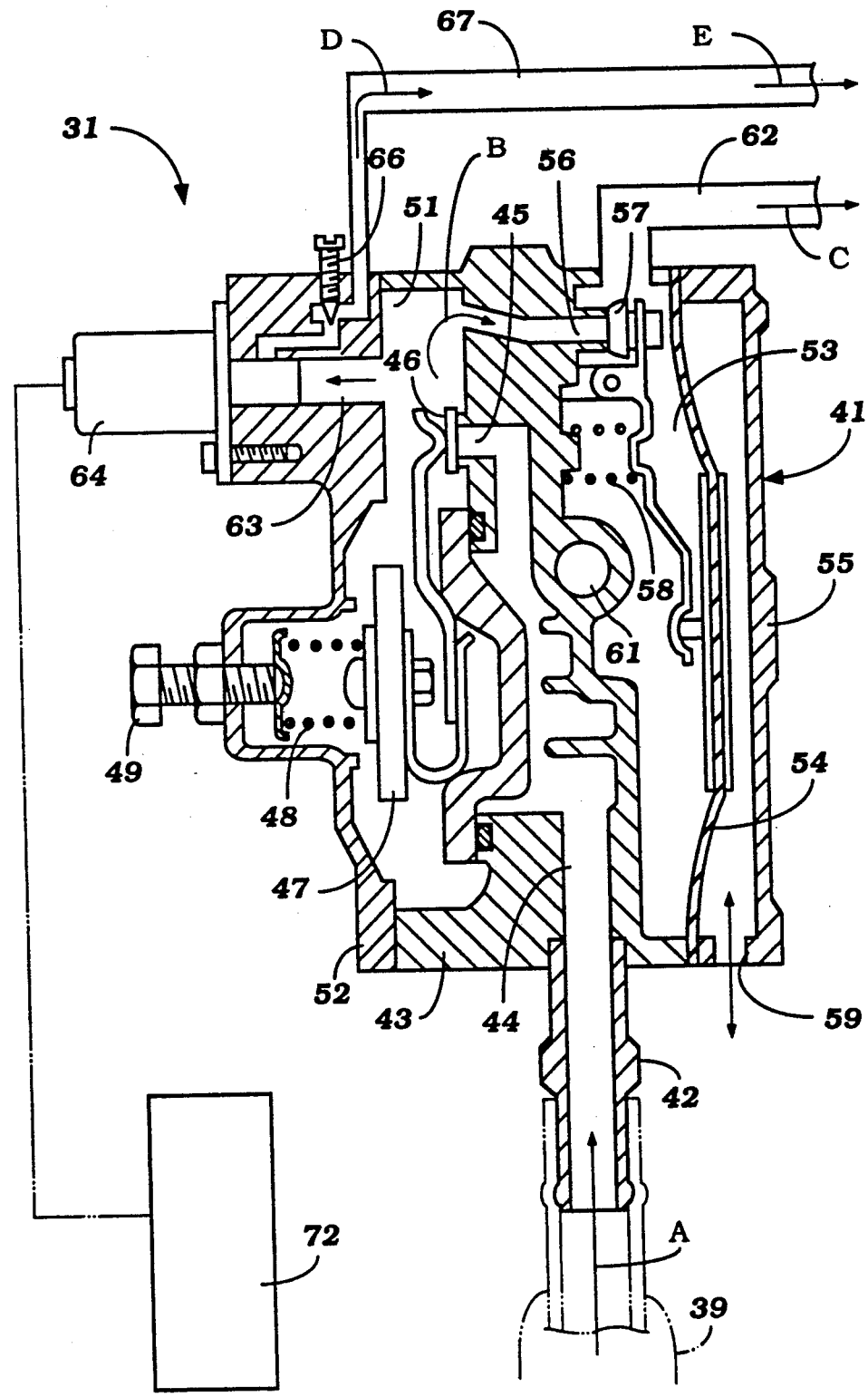
FIG. 4 is a cross sectional view, in part similar to FIG. 3, and shows a further embodiment of the invention.

FIGS. 4 and 5 illustrate another embodiment of the invention which is generally the same as the embodiment of FIGS. 1 through 3 and, for that reason, components of this embodiment which are the same as the previously described embodiment have been identified by the same reference numerals and will not be described again, except insofar as is necessary to understand the construction and operation of this embodiment.

This embodiment deletes the incorporation of enrichment for cold starting and for acceleration and hence the enrichment control valve 71 and conduits associated with it are deleted. In addition, in this embodiment the idle fuel is adjusted by an idle fuel adjusting screw 101 that cooperates with the idle discharge port 78 of the carburetor 31. The transition ports 79 in this embodiment have no fuel controlling needle valve. Aside from these two difference, this embodiment is the same as that previously described and, for that reason, further description of this embodiment is not believed to be necessary to understand the construction and operation of the invention.

It should be readily apparent from the foregoing description that the described system provides extremely good engine operation with a gaseous fuel and allows the air/fuel ratio to be controlled with extreme accuracy by mixing air with the gaseous fuel after the pressure has been regulated but before the flow controlling device of the charge former so as to insure that the air added to the fuel will significantly alter the air/fuel ratio. Of course, the preceding description is that of preferred embodiments of the invention and various changes and modification may be made without departing from the spirit and scope of the invention, as defined by the appended claims.

I claim:

1. A charge forming system for an internal combustion engine comprising a carburetor for mixing fuel with atmospheric air for delivery to a combustion chamber of said engine, said carburetor having a main fuel discharge circuit including a main fuel control means for controlling the amount of fuel mixed with atmospheric air in said carburetor, a source of gaseous fuel stored under pressure as a liquid, pressure regulator means communicating with said source for reducing the pressure of said fuel in a gaseous fuel from said source for delivery to said carburetor fuel control means, means for selectively mixing atmospheric air with said fuel between said regulator and said carburetor fuel control means and an additional fuel circuit for said carburetor having means for adjusting the fuel supply to said additional fuel supply circuit, said means for selectively mixing atmospheric air delivering atmospheric air also to said additional fuel circuit upstream of said means for adjusting the fuel flow through said additional circuit.

2. A charge forming system as set forth in claim 1 wherein at least one of the fuel control means comprises a needle valve.

3. A charge forming system as set forth in claim 2 wherein at least one of the carburetor fuel control means further includes a throttle valve.

4. A charge forming system as set forth in claim 3 wherein the means for selectively mixing atmospheric air with the fuel comprises a separate air bleed for receiving atmospheric air.

5. A charge forming system as set forth in claim 4 wherein there is an independent air bleed for each fuel circuit of the carburetor.

6. A charge forming system as set forth in claim 5 further including means for adding additional fuel to the engine for enrichment purposes under certain engine condition.

7. A charge forming system as set forth in claim 6 wherein the certain engine condition comprises acceleration.

8. A charge forming system as set forth in claim 6 wherein the certain engine condition comprises cold starting.

9. A charge forming system as set forth in claim 8 wherein the certain engine condition also includes acceleration.

10. A charge forming system as set forth in claim 9 further including means for shutting off the supply of fuel to at least certain circuits of the carburetor in the event of an emergency condition.

11. A charge forming system as set forth in claim 1 wherein the means for selectively mixing atmospheric air with the fuel is controlled by a sensor.

12. A charge forming system as set forth in claim 11 wherein the sensor senses air/fuel ratio to maintain a constant air/fuel ratio by mixing atmospheric air with the fuel.

13. A charge forming system as set forth in claim 12 wherein the sensor comprises an oxygen sensor.

14. A charge forming system as set forth in claim 12 wherein the carburetor fuel control means comprises a needle valve.

15. A charge forming system as set forth in claim 14 wherein the carburetor fuel control means further includes a throttle valve.

16. A charge forming system as set forth in claim 15 wherein the means for selectively mixing atmospheric air with the fuel comprises a separate air bleed for receiving atmospheric air.

17. A charge forming system as set forth in claim 16 wherein there is an independent air bleed for each fuel circuit of the carburetor.

18. A charge forming system as set forth in claim 17 further including means for adding additional fuel to the charge former for enrichment purposes under certain engine condition.

19. A charge forming system as set forth in claim 18 wherein the certain engine condition comprises acceleration.

20. A charge forming system as set forth in claim 18 wherein the certain engine condition comprises cold starting.

21. A charge forming system as set forth in claim 20 wheein the certain engine condition also includes acceleration.

22. A charge forming system as set forth in claim 21 further including means for shutting off the supply of fuel to at least certain circuits of the carburetor in the event of an emergency condition.

23. A charge forming system for an internal combustion engine comprising a carburetor for mixing fuel with atmospheric air for delivery to a combustion chamber of said engine, said carburetor having fuel control means for controlling the amount of fuel mixed with atmospheric air in said carburetor comprising a needle valve and a throttle valve, a source of gaseous fuel stored under pressure as a liquid, pressure regulator means communicating with said source for reducing the pressure of said fuel in a gaseous fuel from said source for delivery to said carburetor fuel control means, and means for selectively mixing atmospheric air with said fuel between said regulator and said carburetor fuel control means, said carburetor having a main fuel circuit and another fuel circuit, said carburetor fuel control means being provided in said other fuel circuit of the carburetor.

* * * * *